United States Patent
Wilson

(10) Patent No.: US 9,483,880 B2
(45) Date of Patent: Nov. 1, 2016

(54) AUTOMOTIVE ECU MOBILE PHONE INTERFACE

(75) Inventor: Hendalee Wilson, Springfield, MA (US)

(73) Assignee: CellAssist, LLC, Amherst, MA (US)

( * ) Notice: Subject to any disclaimer, the term of this patent is extended or adjusted under 35 U.S.C. 154(b) by 2173 days.

(21) Appl. No.: 11/423,873

(22) Filed: Jun. 13, 2006

(65) Prior Publication Data

US 2009/0125178 A1     May 14, 2009

(51) Int. Cl.
  *G06F 19/00*   (2011.01)
  *G07C 5/00*    (2006.01)
  *B60W 50/02*   (2012.01)

(52) U.S. Cl.
  CPC .............. *G07C 5/008* (2013.01); *B60W 50/02* (2013.01)

(58) Field of Classification Search
  CPC ............ G06F 19/00; G06F 7/00; G07C 5/00
  USPC .......................................... 701/33; 455/414.4
  See application file for complete search history.

(56) References Cited

U.S. PATENT DOCUMENTS

| | | | |
|---|---|---|---|
| 4,602,127 A | 7/1986 | Neely et al. | |
| 4,843,557 A | 6/1989 | Ina et al. | |
| 4,924,398 A | 5/1990 | Fujiwara | |
| 4,989,146 A | 1/1991 | Imajo | |
| 5,243,852 A | 9/1993 | Morita | |
| 5,442,553 A | 8/1995 | Parrillo | |
| 5,781,125 A | 7/1998 | Godau et al. | |
| 5,844,473 A | 12/1998 | Kaman | |
| 5,884,202 A | 3/1999 | Arjomand | |
| 6,175,934 B1 | 1/2001 | Hershey et al. | |
| 6,278,919 B1 | 8/2001 | Hwang et al. | |
| 6,330,499 B1 | 12/2001 | Chou et al. | |
| 6,339,736 B1 * | 1/2002 | Moskowitz | G06Q 10/087 340/988 |
| 6,370,454 B1 | 4/2002 | Moore | |
| 6,507,810 B2 * | 1/2003 | Razavi | G01C 21/26 703/23 |
| 6,668,219 B2 | 12/2003 | Hwang et al. | |
| 6,920,382 B2 | 7/2005 | Katagishi et al. | |
| 6,956,501 B2 | 10/2005 | Kitson | |
| 6,972,669 B2 * | 12/2005 | Saito | B60G 17/0185 340/438 |
| 7,023,332 B2 | 4/2006 | Saito et al. | |
| 7,073,714 B2 * | 7/2006 | Namaky | G07C 5/0816 235/462.15 |
| 2002/0044049 A1 * | 4/2002 | Saito | B60G 17/0185 340/438 |
| 2004/0249557 A1 * | 12/2004 | Harrington | G01M 17/007 701/115 |
| 2005/0096805 A1 * | 5/2005 | Fudali | G07C 5/008 701/31.4 |
| 2007/0156311 A1 * | 7/2007 | Elcock | G07C 5/008 701/31.4 |
| 2009/0125178 A1 * | 5/2009 | Wilson | G07C 5/008 701/31.4 |

* cited by examiner

*Primary Examiner* — Thomas G Black
*Assistant Examiner* — Wae Louie
(74) *Attorney, Agent, or Firm* — Wolf, Greenfield & Sacks, P.C.

(57) ABSTRACT

A system uses a mobile phone to extract automotive data from an automobile's engine control unit. The system translates the data into human readable form. The translated data is displayable on the mobile phone. The translated data is also transmitted over a network, such as the Internet, in order to call for roadside assistance and to inform repair personnel of the needed repairs.

15 Claims, 4 Drawing Sheets

AUTOMOTIVE ECU MOBILE PHONE INTERFACE

FIELD OF THE INVENTION

The present invention relates to use of a mobile phone to extract automotive data from an automobile's engine control unit (ECU) and translate it into human readable form on the phone's display, while simultaneously broadcasting the information over an Internet-based system for immediate repair and roadside assistance.

BACKGROUND OF THE INVENTION

The Environmental Protection Agency (EPA) requires vehicle manufacturers to install on-board diagnostics (OBD-II) for monitoring light-duty automobiles and trucks beginning with model year 1996. OBD-II systems (e.g., microcontrollers and sensors) monitor the vehicle's electrical and mechanical systems and generate data that are processed by a vehicle's engine control unit (ECU) to detect any malfunction or deterioration in the vehicle's performance. Most ECUs transmit status and diagnostic information over a shared, standardized electronic bus in the vehicle. The bus effectively functions as an on-board computer network with many processors, each of which transmits and receives data. The primary computers in this network are the vehicle's electronic-control module (ECM) and power-control module (PCM). The ECM typically monitors engine functions (e.g., the cruise-control module, spark controller, exhaust/gas recirculator), while the PCM monitors the vehicle's power train (e.g., its engine, transmission, and braking systems). Data available from the ECM and PCM include vehicle speed, fuel level, engine temperature, and intake manifold pressure. In addition, in response to input data, the ECU also generates 5-digit 'diagnostic trouble codes' (DTCs) that indicate a specific problem with the vehicle. The diagnostic trouble codes need to be coupled with OBD-II documentation so the fault code produced by the vehicle can be conceptualized by the auto owner. For instance a DTC of P0118 can be translated to the text 'Engine coolant temperature circuit high input.' The presence of a DTC in the memory of a vehicle's ECU typically results in illumination of the 'Service Engine Soon' light present on the dashboard of most vehicles.

Data from the above-mentioned systems are made available through a standardized, serial 16-cavity connector referred to herein as an 'OBD-II connector'. The OBD-II connector typically lies underneath the vehicle's dashboard. When a vehicle is serviced, data from the vehicle's ECM and/or PCM is typically queried using an external engine-diagnostic tool (commonly called a 'scan tool') that plugs into the OBD-II connector. The vehicle's engine is turned on and data are transferred from the engine computer, through the OBD-II connector, and to the scan tool. The data are then displayed and analyzed to service the vehicle. Scan tools are typically only used to diagnose stationary vehicles or vehicles running on a dynamometer.

Some vehicle manufacturers also include complex electronic systems in their vehicles to access and analyze some of the above-described data. For example, General Motors includes a system called 'On-Star' in some of their high-end vehicles. On-Star collects and transmits data relating to these DTCs through a wireless network. On-Star systems are not connected through the OBD-II connector, but instead are wired directly to the vehicle's electronic system. This wiring process typically takes place when the vehicle is manufactured.

Prior to this invention, connecting to the OBD-II interface required large costly hardware, which utilized proprietary software. In addition, many of the tools used to access automobile information returned native codes, which are not in a descriptive form and does not offer the any indication of the vehicle's malfunction. Furthermore, a vehicle would have to be transported to a location in which the automobile information could be retrieved. Also, instances arise in which vehicles have stored information that state the vehicle should not be driven any further. This cannot be derived until the vehicle is brought to a location that has the expertise, hardware, and software to tell the owner that this is the case. This could cause extreme and irreversible damage to the vehicle. Lastly, the information about the vehicle's information is local. This information is compiled locally and not compiled into a database.

The current state of automotive repair service is one where an organization must wait for an individual to come in and try to explain symptoms that they perceive the vehicle as having. Automotive repair services must allocate time and resources after the technician have checked the vehicle. This leads to much inefficiency in resource allocation at these organizations.

SUMMARY

The Automotive Cellular Interface is a system that uses cellular phones to access automobile computer systems, interpret the information and show the text on the cellular phones display while simultaneously transmitting the retrieved information, as well as characteristic and states of the cellular phone used to access the vehicle computer system, to a global network that would alert parties who could assist or benefit from the retrieved automobile information. An example could be, but is not limited to, the following scenario:

The invention is a system for interfacing mobile phones with an on-board diagnostic computer in a vehicle, wherein the on-board diagnostic computer monitors a set of operational characteristics of a vehicle. The information derived from this system will be processed on the mobile phone coupled with additional information and displayed on the mobile phone's screen, while simultaneously transmitting this information over the Internet to be stored in a database.

DRAWINGS

DESCRIPTION

Figure 1:
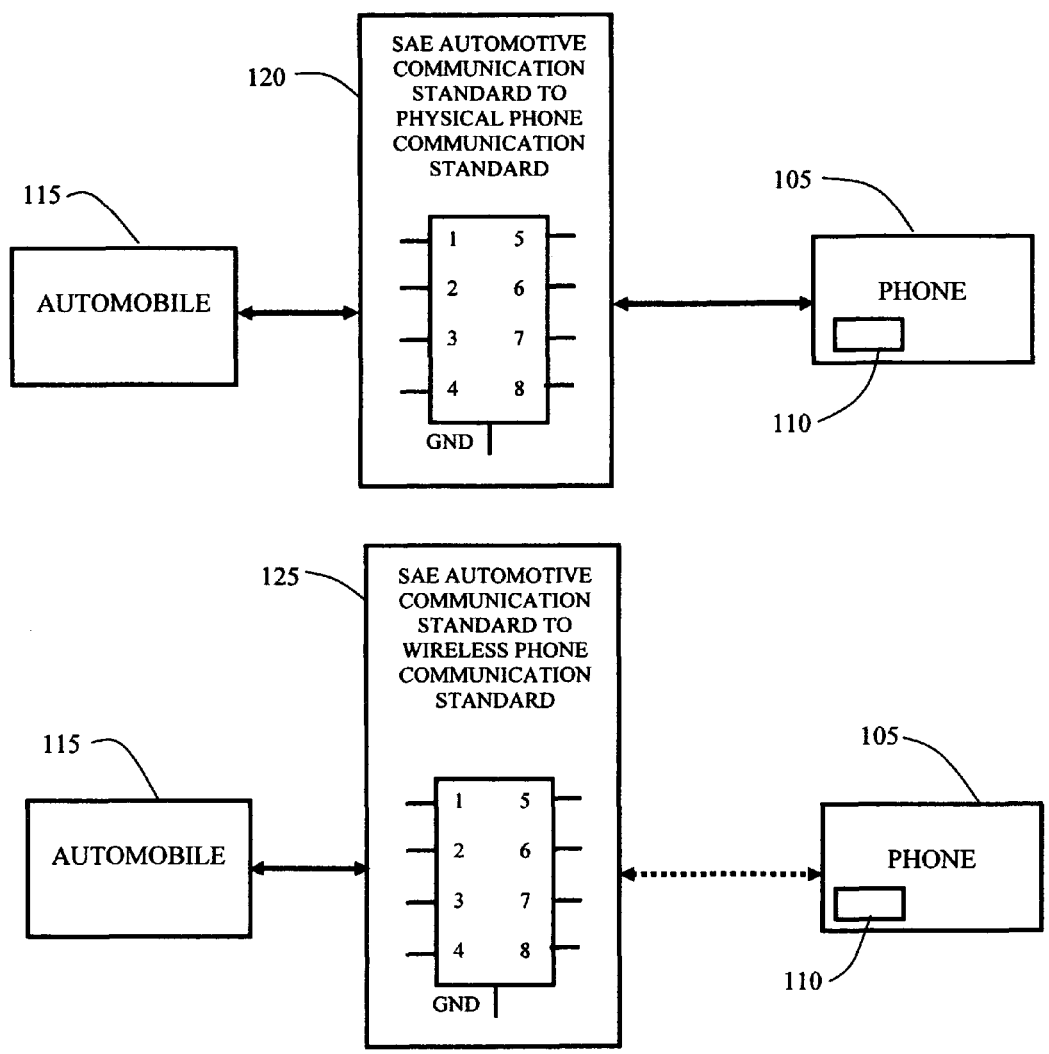
FIG. 1 is a schematic drawing of a system of the invention featuring a single vehicle making contact with the vehicle via a microcontroller.
Figure 2:
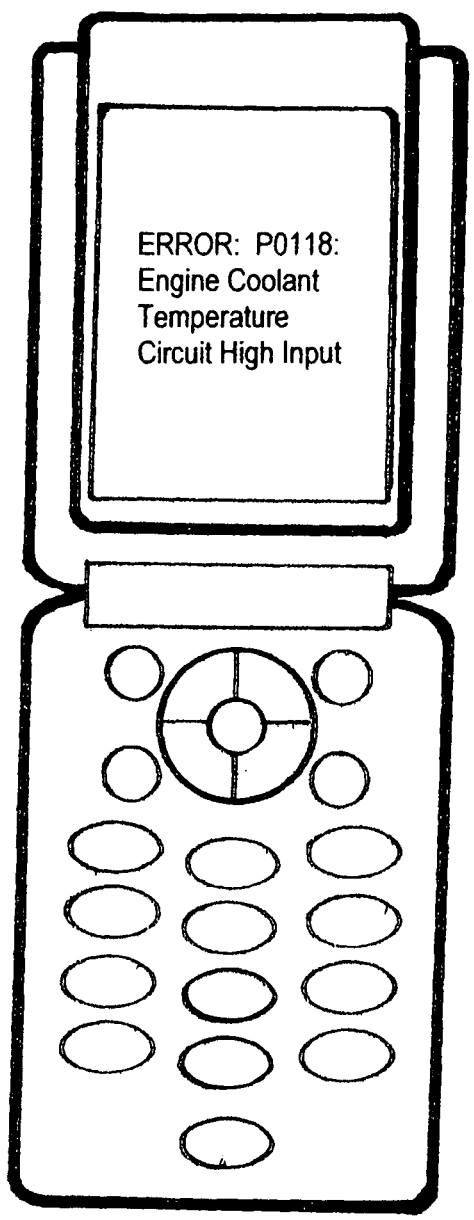
FIG. 2 is an example of the mobile phone display after information has been extracted from the vehicle's ECU.

FIG. 1 shows a cellular phone 105 with a software application 110 that can establish a connection with the automobile 115. In addition, at the point of communication negotiation, the application 110 on the cellular phone 105 extracts position location and transmits the response from the vehicle and the location to a server 325 (FIG. 3) ready to receive this information.

Operation of FIG. 1—the standard for the automotive industry for vehicles is the SAE J1850 communications protocol which utilizes variable pulse width modulation and pulse width modulation. This means that the width of the pulse determines whether it is a 1 or a 0. Most phones form communication with serial connections (RS-232, Infrared . . . etc) and wireless connection protocols (Bluetooth, Infrared . . . etc). These two protocols must be converted or bridged by some sort of microprocessor so the two communication methodologies can communicate with each other. This can be accomplished by using an 8-pin integrated circuit 120, 125 that can be used to convert the OBD-II signal (which includes different protocols such as, but not limited to: J1850 VPW, J1850 PWM, ISO 9141-2, ISO 14230, ISO 15765) to one of the aforementioned phone communication formats. This can be accomplished by creating an integrated circuit with a Microchip Technology PIC1 2C5XX 8 pin 8-bit CMOS micro controller (1). The circuit should have a male end (GM part #12110252) OBD-II connector, and male terminals (GM Part #1 2047581) on one end and a DB9 serial port connector at the other. It is recommended that the pins are configured in such a manner that serial hardware handshaking is not required.

The following configuration of the microcontroller makes this communication possible:

Pin 1—This pin should be the positive supply pin and should always be the most positive point in the circuit. Internal circuitry connected to this pin should be used to provide power on the reset of the controller, so an external reset signal is not required.

Pin 2 and Pin 3—A 3.57 MHZ NTSC television colourburst crystal is connected between these two pins. Crystal loading capacitors (27 pF) will also be connected between the pin and the common circuit.

Pin 4—The OBD data is input to this pin with a high logic level representing an active state, and a low logic level indicating a passive state. No Schmitt trigger input is provided so the OBD signal should be buffered to minimize transition time for the internal CMOS circuitry.

Pin 5—The transmit signal can be connected directly to this pin as long as a current limiting resistor is installed in series. Internal signal inversion and Schmitt trigger wave shaping provide necessary signal conditioning.

PIN 6—This the data output pin.

PIN 7—This is the active low output signal, which is used to drive the OBD bus to its active State.

Pin 8—Circuit common is connected to this pin. This is the most negative point in the circuit.

There are many ways to program this microcontroller for our purpose. Please refer to document 2 for documentation on programming the microcontroller. The microcontroller 120, 125 aides this process by negotiating timing and voltage differences between automobiles and mobile phones. This is the preferred method as to avoid damaging the automobile computer system and the mobile phone.

Figure 3:
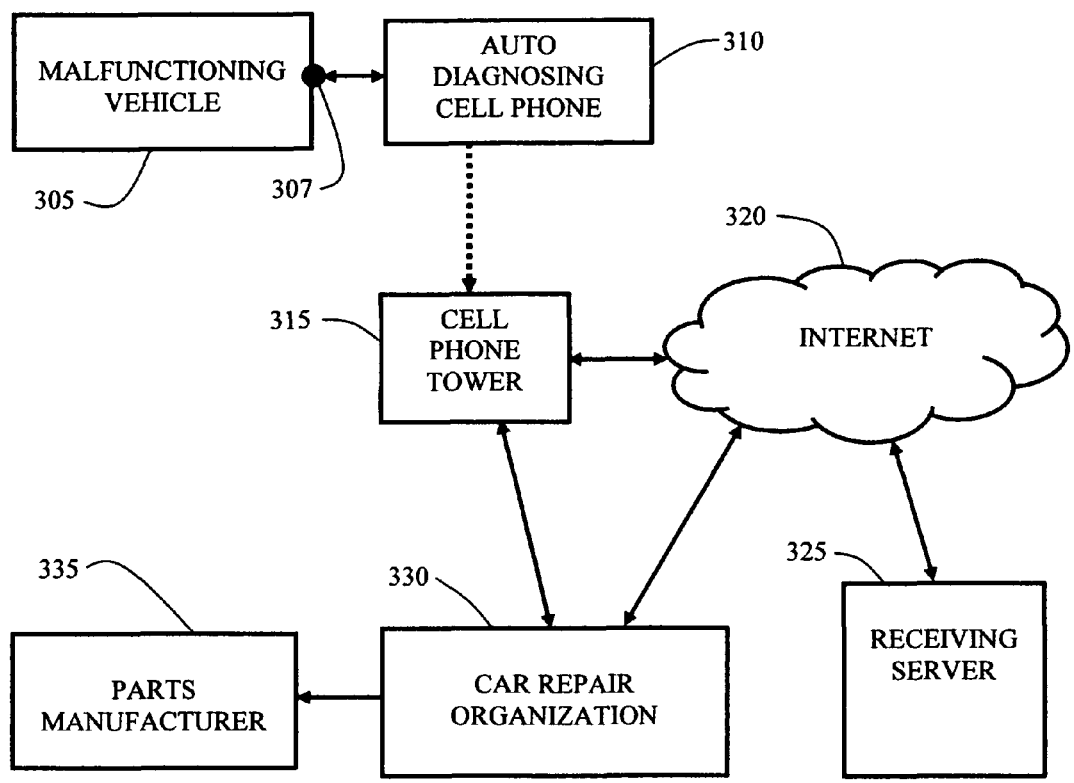
FIG. 3 is a schematic of the flow of information through the system of the invention showing the dialogue between the users, the system, and organizations connected to the system.
Figure 4:
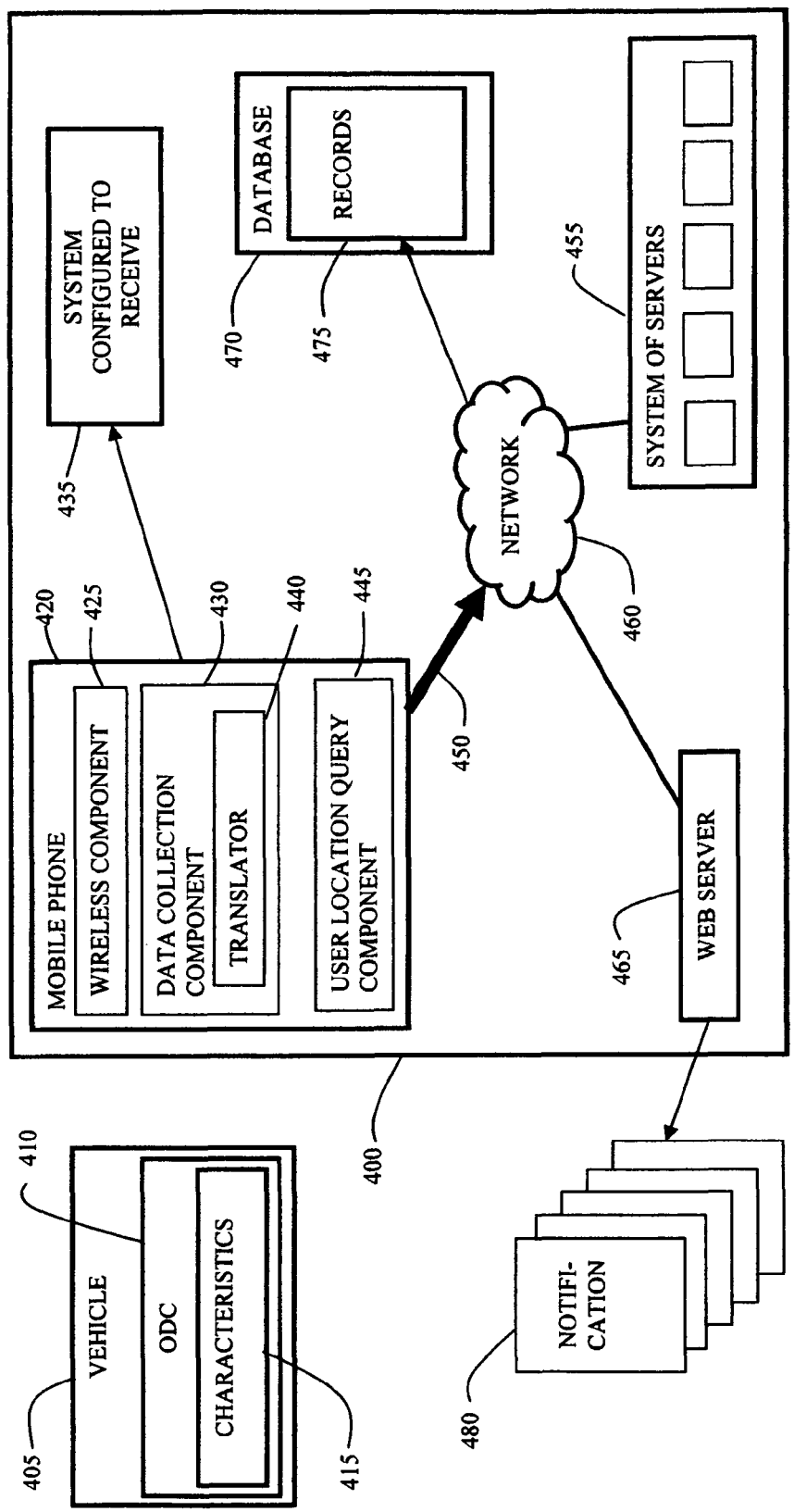
FIG. 4 illustrates a system for interfacing with an on-board diagnostic computer in a vehicle.

FIG. 3 shows a method describing how the system in FIG. 1 typically operates. The mobile phone 310 operates software that acts as a data-collection agent that connects to a microcontroller connected to the vehicle's OBD-II port 307 that formats that OBD-II data into a communication protocol that the mobile phone 310 can decipher with its native hard and software.

In one mode of function, the information extracted from the ECU's memory is used to query an information source that has the DTC translation from SAE standard to textual description of information.

At this point other information about the mobile phone 310 and the vehicle's location is being gathered by software housed on the phone. No additional hardware will be added to the phone because federal law mandates that mobile phone have location based services. Further, information about the mobile phone user such, such as phone number, can also be extracted from the phone.

A connection is established to the Internet 320 and the above information (the DTC, the location of the malfunctioning vehicle 305, and the user's contact information) is broadcasting to a server 325 which receives the information and stores the information into a database.

A system 400 for interfacing with an on-board diagnostic computer 410 in a vehicle 405, wherein the on-board diagnostic computer 410 monitors a set of operational characteristics 415 of a vehicle 405, the system 400 comprising: a mobile phone 420 which during use communicates with the vehicle's on-board diagnostic computer 410, said mobile phone 420 comprising: a wireless communication component 425 and a data-collection component 430, said wireless communication component 425 configured to transmit data received from said on-board diagnostic computer 410 in a vehicle 405 to a system configured to receive 435 the aforementioned broadcast, said data-collection component 430 is configured to extract a set of operational characteristics 415 that are monitored by the on-board diagnostic computer 410 and translate the data from its native form as described in the SAE J 1979 to a textual format as described by the OBD-Il standard and viewable on the display on the mobile phone 420.

The system 400 transmits the data to a system 435 configured to receive transmissions. The mobile phone 420 houses software 440 that translates data from codes to explanatory text. The mobile phone 420, 445 queries itself to get information about the user and the user's location. The mobile phone 420 organizes this data and forms an http or https connection 450 and transmits the data. A system of servers 455 connected to a network 460 is configured to receive transmissions of automobile on-board diagnostic computer information. The system 400 further comprises a web server component 465.

The web server 465 has the ability to compile and execute scripting computer languages, such as, but not limited to ASP, PHP, PERL or the like. The system 400 further comprises a database component 470. The web server 465 can connect to insert records 475 into the database component 470. A system of web pages 480 displays information received from the system 400. The system of web pages 480 has a means for notification of incoming information.

Parties interested in this information can and will be notified when broadcasts happen in their area.

Other embodiments are also within the scope of the invention. The information that is collected in these broadcasts can be utilized for many different purposes, for instance, this information can be used to discover trends in malfunctions or sensor readings in a geographic location. Many organizations (i.e. automobile manufacturers 335) could use this information to improve their operations. An example of this could be an automobile manufacturer noticing that cars in cold or hot geographic areas have a common component failure and infer that temperature plays a role in the failure. This information could help auto manufacturers enact costly recalls sooner than later.

In addition the information received by an organization could be integrated and/or imported into their existing computer information systems to improve operations and increase efficiency. For instance, information that arrives at the repairing organization 330 could be used to automatically order parts necessary for the repair. Also, incoming information could be integrated into the repairing organization's scheduling system so repairs are executed more efficiently.

Furthermore information derived from this system can be used to increase competition between repairing organizations. Since geographic information is part of the transmitted dataset, local repair shops will have indications on who is broken down and their current location. Repair shops will also have the capacity to contact these individuals (because their cell phones numbers will also be part of the dataset) and offer their services. Organizations will have to realize that automobile malfunctions are now public knowledge and structure the prices of their services accordingly. Automobile owners will have the opportunity to receive bids for many service providers and pursue the most economically viable.

Lastly users of this system will be able to form more meaningful dialogues with repairing parties because the technical information will be translated into terminology that even the novice would find comprehensible. Instead, of the user viewing fault code "P1358" they will see "P1358: Misfire during start cylinder 9." This will form a check and balance when conversations about the extent of the repair occur. A user who sees "P1358: Misfire during start cylinder 9" will instantaneously know they do not need to replace the transmission, thereby avoiding costly, as well as, unnecessary repairs.

What is claimed is:

1. A system for interfacing with an on-board diagnostic computer in a vehicle, wherein the on-board diagnostic computer monitors a set of operational characteristics of a vehicle, the system comprising:
   a mobile phone in communication with on-board diagnostic computer, said mobile phone including:
      a wireless communication component configured to transmit data received from said on-board diagnostic computer to a system configured to receive the data, and
      a data-collection component configured to extract a set of operational characteristics that are monitored by the on-board diagnostic computer and translate the operational characteristics from an SAE J 1979 format to a OBD-II textual format and viewable on a display of the mobile phone.

2. The system of claim 1, wherein the system transmits the data to a second system configured to receive transmissions.

3. The system of claim 1 wherein the mobile phone includes software that translates data from codes to explanatory text.

4. The system of claim 1 wherein the mobile phone queries itself to get information about the user and the user's location.

5. The system of claim 1 wherein the mobile phone organizes the data and forms an http or https connection and transmits the data.

6. The system of claim 1 further comprising a system of servers connected to a network, the system of servers configured to receive transmission of automobile on-board diagnostic computer information.

7. The system of claim 6, wherein the system of servers further comprises a web server component.

8. The system of claim 7, wherein the web server component has the ability to compile and execute scripting computer languages.

9. The system of claim 6, wherein the system of servers further comprises a database component.

10. The system of claim 8 wherein the system of servers further comprises a database component and wherein the web server component communicates with the database component to insert records.

11. The system of claim 1 further comprising a plurality of web pages that display information received from the wireless communications component.

12. The system of claim 6 further comprising a plurality of web pages that display information received from the system of servers.

13. The system of claim 6 wherein the system of servers includes a means for notification of incoming information.

14. The system of claim 1 further comprising a server including a database, the server to receive data transmissions from the mobile phone and to store the received data from the data transmissions in the database in a collection of vehicle information.

15. A system for interfacing with an on-board diagnostic computer in a vehicle, comprising: means for collecting data from the on-board diagnostic computer; means for translating the collected data to a mobile phone-usable format including means for translating data in SAE J 1979 format to data in OBD-II format; means for formatting the translated data to a text format displayable on a mobile phone display; and means for communicating to the Internet to send the collected data to a server,
   wherein the means for communicating to the Internet further comprises means for transmitting identity data and location data.

* * * * *